United States Patent [19]

Würsch et al.

[11] Patent Number: 5,100,475
[45] Date of Patent: Mar. 31, 1992

[54] PROCESS FOR THE PRODUCTION OF A STARCH DISPERSIBLE IN BOILING WATER

[75] Inventors: Pierre Würsch; Philippe Roulet, both of La Tour-de-Peilz, Switzerland

[73] Assignee: Nestec S.A., Vevey, Switzerland

[21] Appl. No.: 690,516

[22] Filed: Jan. 11, 1985

[30] Foreign Application Priority Data

Feb. 1, 1984 [CH] Switzerland ............... 466/84

[51] Int. Cl.$^5$ ............................... C08B 30/00
[52] U.S. Cl. ............................... 127/67; 127/71
[58] Field of Search ............... 127/28, 32, 33, 67, 127/71; 426/243, 578, 579, 661

[56] References Cited

U.S. PATENT DOCUMENTS

| | | | |
|---|---|---|---|
| 3,137,592 | 6/1964 | Protzman et al. | 127/28 X |
| 4,260,642 | 4/1981 | Mitchell et al. | 127/71 X |
| 4,418,090 | 11/1983 | Bohrmann et al. | 127/71 X |
| 4,491,483 | 1/1985 | Dudacek et al. | 127/33 |
| 4,508,576 | 5/1985 | Mudde | 127/33 X |

OTHER PUBLICATIONS

Kirk–Othmer, Encyclopedia of Chemical Technology, 3rd Edi., vol. 21, pp. 492–493 (1983).

*Primary Examiner*—W. Gary Jones
*Attorney, Agent, or Firm*—Vogt & O'Donnell

[57] ABSTRACT

The invention relates to a process for the production of a starch dispersible in boiling water by heat treatment in the presence of water and an emulsifier. A mixture of starch, an emulsifier containing at least one fatty acid monoester in a quantity of from 1 to 5% by weight of fatty acid monoester, based on the dry weight of the starch, and water is prepared in such a way that the water content of the mixture amounts to between 20 and 30% by weight, and the mixture is heat-treated for 1 to 20 mins at a temperature of 90° to 120° C. to obtain a starch showing 95 to 100% dispersibility in boiling water.

9 Claims, No Drawings

PROCESS FOR THE PRODUCTION OF A STARCH DISPERSIBLE IN BOILING WATER

This invention relates to a process for the production of a starch dispersible in boiling water by heat treatment in the presence of water and an emulsifier and to a dispersible starch obtained by this process.

The culinary use of starches of cereals, tubers or other starchy materials as binders or as thickeners, particularly in the preparation of sauces and soups, is often difficult. This is because it is not easy to control the gelatinization rate and the thickening power of starches. When it is attempted, for example, to disperse a starch either on its own or in admixture with other ingredients which are themselves dispersible in boiling water by pouring directly into boiling water while stirring, it is not possible to avoid the formation of clumps.

Various processes have been proposed with a view to improving the dispersibility of starches in boiling water. One of these processes comprises heat-treating the starch in the presence of water under such conditions that gelatinization of the starch is avoided. Typical conditions which have been described include heating in a sealed container for 2 to 3 h at 90° to 120° C. in the presence of approximately 20 to 25% of water. It is also possible in particular to apply treatment conditions described as relatively gentle, under which a native potato starch having a moisture content of 19.2% is heated in a sealed container for 115 minutes at 103° C. so as to retard gelatinization of the starch in boiling water by a few seconds only and to leave the dispersion with a relatively high final viscosity.

In another known process, starch is subjected to microwave treatment under such conditions that it does not reach a temperature above 100° C. and its crystallinity decreases by at least 50% without the starch gelatinizing. The starch may be moistened in such a way that it has a moisture content of, for example, from 25 to 50% and the treatment may last from 20 s to 15 mins. However, the dispersibility in boiling water of the starch thus treated barely exceeds 50% in the majority of cases.

Another known process comprises heat-treating starch in the presence of water and an emulsifier under such conditions that the starch forms a complex with the emulsifier without gelatinizing. The conditions described are very similar to the typical conditions mentioned above in reference to heat treatment in the presence of water with, in addition, the presence of at least 0.25% of an emulsifier. The treatment times amount to several hours. The treatment is preferably carried out in a sealed container. This process appears to be particularly suitable for tapioca.

The object of the present invention is to provide a process for the production of a starch dispersible in boiling water which can be carried out in a few minutes and which gives particularly good results with potato starch.

To this end, the process according to the present invention is characterized in that a mixture of starch, an emulsifier containing at least one fatty acid monoester in a quantity of from 1 to 5% by weight of fatty acid monoester, based on the dry weight of the starch, and water is prepared in such a way that the water content of the mixture amounts to between 20 and 30% by weight and in that the mixture is heat-treated for 1 to 20 mins at 90° to 120° C. to obtain a starch of which 95 to 100% is dispersible in boiling water. The starch used is preferably potato starch.

It has been found that a complexing level of the amylose by fatty acid monoesters in the granules of native starch amounting to between about 50 and 100% of the maximum possible level can be obtained in a few minutes or less by heat-treating the starch at a temperature of 90° C. or higher in the presence of a sufficient quantity of fatty acid monoester and an adequate quantity of water.

The starch dispersible in boiling water obtained by the process according to the invention may be characterized by the fact that it has a gelatinization temperature above 80° C. and an increasing or constant Brabender viscosity in aqueous dispersion at 95° C. Preferably, it has a Brabender viscosity in the form of a 6% by weight aqueous dispersion of from 150 to 350 Brabender units (BU) after 5 minutes at 95° C.

In the context of the invention, the gelatinization temperature is the temperature at which a 6% by weight aqueous dispersion of starch reaches a Brabender viscosity of 20 BU at the beginning of an amylogram recorded with a Brabender amylograph.

It is convenient at this juncture to recall that an amylogram indicates the development of the viscosity of an aqueous suspension or dispersion of amylaceous material as a function of temperature in the course of a program comprising a well defined heating phase, holding phase and cooling phase. During the heating phase, the temperature of the dispersion is increased linearly from about 20° C. to 95° C. at a rate of 1.5° C./min. During the holding phase, the temperature is held at 95° C. for 20 to 30 minutes. During the cooling phase, the temperature is returned linearly to the starting value at a rate of 1.5° C./min. In the course of this program, the dispersion is subjected to mechanical stirring under fixed conditions known to the expert. It is the resistance of the dispersion to stirring which is taken as the criterion of viscosity and which is expressed in specific units known as Brabender units symbolized by the letters BU.

Similarly, in the context of the invention, such an expression as "the Brabender viscosity after 5 mins at 95° C." is to be interpreted as meaning the viscosity of a dispersion shown on its amylogram after the first five holding minutes at 95° C.

Finally, the dispersibility of the starch in boiling water is determined by a standard test comprising pouring 6 g of starch into 200 ml of boiling water, stirring gently for 15 s with a spoon and, after standing for 30 s, passing the dispersion through a 0.85 m mesh sieve. The clumps retained are oven-dried for 5 h at 120° C. and then weighed. The dispersibility expressed in percent is equal to the difference between the weight of the starch tested and the weight of the starch retained divided by the weight of the starch tested and multiplied by one hundred.

For carrying out the process according to the invention, it is possible to use any starch of which the gelatinization temperature and the resistance to swelling are capable of being increased by the process according to the invention in such a way that from 95 to 100% of the starch is dispersible in boiling water. Potato starch is particularly suitable.

Among the emulsifiers which form complexes with amylose, those consisting of or containing a fatty acid monoester are suitable for use in the proportions indicated. If the emulsifier is used in a quantity of less than 1% by weight of fatty acid monoester, based on the dry weight of the starch, the amylose is not complexed to an adequate level. On the other hand, there is no need to use the emulsifier in a quantity of more than 5% of fatty acid monoester, based on the dry weight of the starch, because a maximal complexing level can be obtained with smaller quantities.

Preferred fatty acid monoesters include mono- or poly-alcohols of the glycerol type and derivatives thereof, propylene glycol, sorbitan, lactylate and carbohydrates mono-esterified with fatty acids. Particularly conclusive results may be obtained in particular with distilled mono-glycerides of vegetable origin, glycerol monostearate and monopalmitate of animal origin, stearoyl-2-lactylate and propylene glycol monostearate.

The water may be added to the mixture in such a quantity that the water content of the mixture amounts to between 20 and 30% by weight. If less water is added, the amylose is not sufficiently complexed by the emulsifier. If more water is added, the starch is in danger of being at least partly gelatinized.

To prepare the mixture, the emulsifier may be premixed with intensive stirring with all or part of the quantity of water required to obtain the desired water content after the water has been heated to a temperature above the melting point of the emulsifier. The premix thus formed and the remaining water, if any, may then be added to the starch with vigorous stirring.

The mixture then has to be heat-treated for 1 to 20 mins. at a temperature of 90 to 120° C. If the heat treatment is carried out at a temperature below 90° C. or for less than 1 min., the amylose will not be sufficiently complexed by the emulsifier. If the heat treatment is carried out at a temperature above 120° C. or for more than 20 mins., the starch is in danger of being at least partly gelatinized.

The heat treatment may be carried out in any way which ensures sufficiently rapid and homogeneous transfer of the heat to the above-mentioned mixture. The heat treatment may be carried out in particular in a sealed container, taking care to preheat the container and to agitate the mixture in the container. In this embodiment, a mixture containing from 20 to 25% of water is preferably prepared and the treatment is carried out for 5 to 20 minutes.

The heat treatment may also be carried out with microwaves selecting, for example, radiation of such power that the temperature of the mixture is rapidly brought to around 100° C. without the water in the mixture being evaporated too rapidly. In this embodiment, a mixture containing from 25 to 30% by weight of water is preferably prepared and the treatment is carried out for 1 to 5 minutes. The mixture thus treated may set and harden on leaving a microwave oven or tunnel. It may then be coarsely ground, dried and finely ground.

The heat treatment may also be carried out by extrusion. This embodiment is particularly promising by virtue of its simplicity. Once again, subsequent grinding steps may advantageously be provided.

In general, after the mixture has been heat-treated under the conditions described above, it may be dried, for example in vacuo or in hot air, until its residual water content is below 10%, so that the dispersible starch thus obtained shows good keeping qualities and good flow properties in the form of fine grains.

In this connection, it may be mentioned that a specific granulometry does not have any significant effect on the dispersibility properties of the dispersible starch, except that excessively large aggregates or excessively coarse fragments are in danger of taking too much time to dissolve in the boiling water. In cases where the dispersible starch is intended to be used in combination with other ingredients which are themselves dispersible in boiling water, it is preferred to select a fine granulometry, more particularly comprising grain sizes below 0.5 mm, in order to be able for example to prepare granulates with a mixture of all the ingredients.

The dispersible starch obtained by the process according to the invention may be characterized more precisely by various factors mentioned in the foregoing which are responsible for its 95 to 100% dispersibility in boiling water. The first factor is that it has a gelatinization temperature above 80° C., i.e. a gelatinization temperature distinctly higher than that of native starches which thus has a marked effect in retarding gelatinization. The second factor is that the dispersible starch according to the invention has an increasing or constant Brabender viscosity in aqueous dispersion at 95° C., i.e. it does not show a Brabender peak or, in other words, it effectively withstands mechanical stirring at 95° C. and its granules do not burst easily after having swollen during gelatinization. A third factor is that the starch according to the invention may have a Brabender viscosity of from 150 to 350 BU in the form of a 6% by weight aqueous dispersion after 5 minutes at 95° C. This means that its thickening power is not reduced to a minimal proportion of the thickening power of native starches expressed by the height of their Brabender peak. This viscosity range of 150 to 350 BU is mentioned here as a preferred and not compulsory range. However, if the viscosity is much beyond 350 BU, the starch granules are in danger of beginning to gelatinize during the heat treatment with the possible appearance of agglutination problems. Similarly, if the viscosity is much below 150 BU, there is a danger that the granules will not swell properly and that the dispersion will have a texture which is not only too fluid, but also sandy.

The starch according to the invention 95 to 100% dispersible in boiling water is intended to be used either on its own or in combination with other dry or dehydrated ingredients themselves dispersible in boiling water as a binder or thickener in the preparation of culinary products, particularly in the preparation of sauces and soups.

The invention is illustrated by the following Examples, in which the gelatinization temperature (°C.), the Brabender viscosity after 5 mins. at 95° C. (BU) and dispersibility in boiling water (%) are defined and determined as indicated in the foregoing. The percentages are by weight, unless otherwise indicated.

EXAMPLE 1

Water is added to native potato starch in a small commercial mixer. A premix prepared under heat from water and fatty acid monoesters, in the present case distilled monoglycerides of vegetable origin, is also added. The respective quantities are calculated so that the mixture thus prepared has a water content of 22% and comprises 3% of fatty acid monoesters, based on the dry weight of the starch.

20 g of this mixture are introduced into a cylindrical container of stainless steel (usable volume 39 cm$^3$) preheated to 90° C. The container is then hermetically sealed and immersed in a heating bath having a temperature of 90° C. The container is left immersed in the bath with agitation for 20 minutes. It is then withdrawn from the bath, left to cool with agitation to ambient temperature and opened.

The dispersible starch thus obtained has a dispersibility in boiling water of 95 to 100%. In the form of a 6% aqueous dispersion, it has a gelatinization temperature of 85° C. and a Brabender viscosity after 5 mins. at 95° C. of 310 BU. Its Brabender viscosity increases from 270 to 310 BU during the first 5 minutes at 95° C., after which it undergoes hardly any further increase and remains substantially constant during the next 15 minutes at 95° C.

COMPARISON EXAMPLE

For comparison, a 6% aqueous dispersion of the native potato starch used in Example 1 is prepared and examined using a Brabender amylograph. The results show that this starch has a gelatinization temperature of 65.0° C. Its Brabender viscosity reaches a maximum value of 600 BU when the temperature reaches 95° C. Its viscosity then decreases distinctly and regularly during the holding phase at 95° C.

EXAMPLES 2–6

Following the procedure described in Example 1, mixtures having various water contents and containing various quantities of fatty acid monoesters expressed in percent, based on the dry weight of the native potato starch, are prepared and heat-treated in a sealed container for different times (t) at different temperatures (T). The preparation conditions and the gelatinization temperatures (Tgel) and Brabender viscosities (6% aqueous dispersion) after 5 mins. at 95° C. ($\eta$; 5 mins., 95° C.) of the dispersible starches thus prepared are shown in Table 1 below in which the particulars of Example 1 are also recalled:

| Ex- ample No. | Mixture water % | monoesters % | Heat treatment T °C. | t mins. | Dispersible starch Tgel °C. | $\eta$ (5 mins., 95° C.) BU |
|---|---|---|---|---|---|---|
| 1 | 22 | 3 | 90 | 20 | 85 | 310 |
| 2 | 20 | 5 | 110 | 10 | 81 | 330 |
| 3 | 22 | 5 | 110 | 10 | 88 | 330 |
| 4 | 22 | 5 | 110 | 15 | 91 | 160 |
| 5 | 25 | 3 | 110 | 10 | 95 | 210 |
| 6 | 22 | 3 | 130 | 5 | 88 | 300 |

All the dispersible starches thus prepared show a dispersibility in boiling water of from 95 to 100%. In the form of 6% aqueous dispersions, their Brabender viscosity at 95° C. continues to increase for the first few minutes, reaching after 5 minutes a value which remains substantially constant for the remainder of the holding phase at 95° C. During the cooling phase following the holding phase, they again undergo a regular increase in viscosity.

EXAMPLES 7–9

Mixtures having various water contents and containing various quantities of fatty acid monoesters expressed in %, based on the dry weight of the native potato starch, are prepared in the same way as described in Example 1 and heat treated with microwaves for different times (t).

To this end, 250 g of a mixture are put on a plate which is placed in a microwave oven having a power output of 1200 W at 2450 MHz. Under these conditions, the temperature of the mixture rises very rapidly to 100° C. and stays at 100° C. throughout the treatment.

The treated mixture is then left to cool in air and ground into particles smaller than 0.5 mm in size.

The preparation conditions and also the gelatinization temperatures (Tgel) and the Brabender viscosities after 5 mins. at 95° C. (5 mins 95° C.) in 6% aqueous dispersion of the dispersible starches thus prepared are shown in the following Table:

| Ex- ample No. | Mixture water % | monoglycerides % | Treatment at 100° C. t mins. | Dispersible starch Tgel °C. | $\eta$ (5 mins., 95° C.) BU |
|---|---|---|---|---|---|
| 7 | 25 | 2 | 2.5 | 81 | 330 |
| 8 | 25 | 5 | 4 | 83 | 300 |
| 9 | 27 | 5 | 2.5 | 83 | 350 |

All the dispersible starches thus prepared show a dispersibility in boiling water of from 95 to 100%. In the form of 6% aqueous dispersions, their Brabender viscosity at 95° C. behaves in the same way as that of the dispersible starches of Examples 1 to 6.

COMPARISON EXAMPLES

Two mixtures each containing 25% of water but only 0.2% and 0.8%, respectively, of fatty acid monoesters, based on the dry weight of the native potato starch, are prepared in the same way as described in Example 1.

These two mixtures are heat-treated by microwaves for 2.5 minutes in the same way as described in Examples 7 to 9. The two products obtained show a dispersibility in boiling water which, although exceeding 50%, does not even remotely approach 95%.

EXAMPLE 10

A premix is prepared from water at 95° C. and an emulsifier containing glycerol monostearate, distearate, monopalmitate and dipalmitate of animal origin and having a monoester content of 40%.

Native potato starch is introduced into a cutter mil and the premix cooled to 70° C. is poured onto the starch while stirring. The respective quantities of starch, water and emulsifier are calculated so that the mixture thus prepared has a water content of 26% and contains 1.4% of monoesters, based on the dry weight of the starch.

The mixture is introduced into boat-shaped containers of polytetrafluoroethylene in a quantity of 90 g per container. The containers are placed on a conveyor belt which passes through a microwave oven having a power output of 3.5 kW at 2450 MHz. The belt thus conveys 15.6 kg/h of mixture in containers through the oven, the containers remaining in the oven for 210 s. The temperature of the mixture rises very rapidly to 100° C. in the oven and stays at 100° C. throughout the passage of the containers, i.e. throughout the heat treatment.

The mixture thus treated is left to cool to ambient temperature. It is coarsely ground into particles a few mm in size and then dried in hot air until its residual water content is approximately 10%. It is then finely ground into particles smaller than 0.5 mm in size.

The dispersible starch thus prepared has a dispersibility of 100%. In the form of a 6% aqueous dispersion, it has a gelatinization temperature of 84° C. and a Brabender viscosity after 5 mins. at 95° C. of 300 BU. Its Brabender viscosity behaves in the same way as that of the dispersible starches of Examples 1 to 6 during the holding phase at 95° C.

EXAMPLE 11

A dispersible starch is prepared in the same way as described in Example 10, except that the mixture has a water content of 29%, the conveyor belt carries 10.6 kg/h of mixture in containers through the oven and the containers remain in the oven for 220 s.

The dispersible starch thus prepared has a dispersibility in boiling water of 100%. In the form of a 6% aqueous dispersion, it has a gelatinization temperature of 84° C. and a Brabender viscosity after 5 mins. at 95° C. of 280 BU. Its Brabender viscosity behaves in the same way as that of the dispersible starches of Examples 1 to 6 during the holding phase at 95° C.

We claim:

1. A process for the production of a potato starch dispersible in boiling water comprising preparing an aqueous mixture of potato starch and an emulsifier, wherein the emulsifier contains at least one fatty acid monoester in a quantity of at least 1% by weight of fatty acid monoester based on the dry weight of the starch and wherein the water content of the mixture is between 20 and 30% by weight, and heat-treating the mixture for from 1 to no more than 20 minutes at a temperature of from 90 to 120° C.

2. A process as claimed in claim 1, wherein the mixture is heat-treated in a sealed container for 5 to 20 mins further comprising preheating the container to 90° to 120° C. and 3. A process as claimed in claim 2, wherein the mixture has a water content of from 20 to 25% by weight.

4. A process as claimed in claim 1, wherein the mixture is heat-treated by microwaves for 1 to 5 mins.

5. A process as claimed in claim 4, wherein the mixture has a water content of from 25 to 30% by weight.

6. A process as claimed in claim 4, wherein microwave power output is at least 1200 W at 2450 MHz.

7. A process as claimed in claim 1, wherein the mixture is heat-treated by extrusion.

8. A process as claimed in claim 1 or claim 4 or claim 7, further comprising, after the heat treatment, coarsely grinding the starch, drying and finely grinding it.

9. A process as claimed in claim 1 wherein the quantity of fatty acid monoester is from 1% to 5% based on the dry weight of the starch.

* * * * *

UNITED STATES PATENT AND TRADEMARK OFFICE
CERTIFICATE OF CORRECTION

PATENT NO. : 5,100,475

DATED : March 31, 1992

INVENTOR(S) : Pierre WÜRSCH, et al.

It is certified that error appears in the above-identified patent and that said Letters Patent is hereby corrected as shown below:

Column 8, line 7 (line 4 of claim 2), after "and", insert: --agitating the mixture during heat-treating.--.

Signed and Sealed this

Twenty-first Day of September, 1993

*Attest:*

BRUCE LEHMAN

*Attesting Officer*   *Commissioner of Patents and Trademarks*